(12) United States Patent  (10) Patent No.: US 7,441,374 B2
Syed et al.  (45) Date of Patent: Oct. 28, 2008

(54) DOOR MODULE PLATE WITH HANDLE

(75) Inventors: Imtiaz Syed, Lake Orion, MI (US); Ronald Moore, Sterling Heights, MI (US)

(73) Assignee: Hi-Lex Corporation, Troy, MI (US)

(*) Notice: Subject to any disclaimer, the term of this patent is extended or adjusted under 35 U.S.C. 154(b) by 101 days.

(21) Appl. No.: 11/172,139

(22) Filed: Jun. 30, 2005

(65) Prior Publication Data

US 2007/0001477 A1  Jan. 4, 2007

(51) Int. Cl.
  *B60J 5/04* (2006.01)
(52) U.S. Cl. .............................. 49/502; 49/460; 292/352
(58) Field of Classification Search ................... 49/502, 49/348, 349, 460; 16/268, 271, 382, 415; 292/336.3, 348, 349, 352, DIG. 53, DIG. 64; 296/146.5
See application file for complete search history.

(56) References Cited

U.S. PATENT DOCUMENTS

| | | | | |
|---|---|---|---|---|
| 2,128,260 A | * | 8/1938 | Morrison | 49/502 |
| 4,447,099 A | * | 5/1984 | French et al. | 312/257.1 |
| 5,101,597 A | * | 4/1992 | Pelachyk et al. | 49/460 |
| 5,183,302 A | * | 2/1993 | Pelachyk et al. | 292/336.3 |
| 5,263,750 A | * | 11/1993 | Smith et al. | 292/336.3 |
| 5,758,454 A | | 6/1998 | Trap et al. | |
| 6,052,948 A | * | 4/2000 | Spitzley | 49/460 |
| 6,059,329 A | * | 5/2000 | Spitzley | 292/336.3 |
| 6,148,564 A | | 11/2000 | Dancasius | |
| 6,401,302 B1 | * | 6/2002 | Josserand et al. | 16/444 |
| 6,536,164 B1 | | 3/2003 | Kirejczyk | |
| 6,571,515 B1 | | 6/2003 | Samways et al. | |
| 6,594,861 B2 | * | 7/2003 | Dimig et al. | 16/412 |
| 6,688,043 B1 | | 2/2004 | Feder et al. | |

* cited by examiner

*Primary Examiner*—Gregory J. Strimbu
(74) *Attorney, Agent, or Firm*—Young Basile

(57) ABSTRACT

A motor vehicle door module assembly in a motor vehicle door structure, the assembly including a module plate, a bracket, and a door handle pivotally mounted on the bracket. Coacting mounting structures are provided on the module plate and on the bracket which are operative in response to linear sliding movement of the bracket relative to the module plate to mount the bracket on the module plate while permitting a limited degree of linear play to facilitate the installation of the module assembly on the door structure. The coacting mounting structures take the form of a plurality of tabs on the module plate and a respective plurality of keyways in the bracket.

4 Claims, 6 Drawing Sheets

DOOR MODULE PLATE WITH HANDLE

BACKGROUND

This invention relates to motor vehicle door assemblies and more particularly to a door module for use in forming a motor vehicle door assembly.

In the assembly of a present day motor vehicle door the inner panel of the door is typically provided with an opening and a door module, typically from a supplier, is fastened in the opening by the OEM on the assembly line. The door module typically carries door accessory items such as the window regulator mechanism. Following installation of the door module the inside door handle mechanism is installed. Alternatively, the inside door handle mechanism is installed on the door module by the supplier and shipped to the OEM. Whereas these procedures are generally satisfactory, they are labor intensive and therefore rather costly.

SUMMARY

This invention is directed to the provision of an improved method and apparatus for forming a motor vehicle door assembly.

The invention methodology relates to a method of mounting a motor vehicle door module in a motor vehicle door structure, the module including a module plate and inside door handle. According to the invention, the method comprises pivotally mounting the handle on a bracket; mounting the bracket on the module plate in a manner to retain the bracket on the module plate while allowing limited adjustment of the bracket relative to the module plate; positioning the module plate in the door structure and fixing the module plate to the door structure; and fixedly securing the bracket to the door structure. This methodology allows the handle to be shipped to the manufacturer as part of the module plate assembly whereafter the bracket may be adjusted relative to the module plate on the assembly line to facilitate the installation of other door accessory items on the door structure.

According to a further feature of the invention methodology, the step of mounting the bracket on the module plate further comprises snappingly latching the bracket to the module plate in response to the sliding movement while allowing a limited amount of play between the bracket and the module plate to provide the desired limited adjustment.

According to a further feature of the invention methodology, the step of mounting the bracket on the module plate further comprises providing a plurality of tabs on one of the bracket and module plate and providing a respective plurality of keyways on the other of the bracket and module plate for respective sliding receipt of the tabs. This arrangement provides a convenient means of mounting the bracket on the door module plate to provide the desired limited adjustment.

The invention apparatus is directed to a motor vehicle door handle assembly including a module plate positionable within the vehicle door structure, a door handle bracket mounted on the module plate, and an inside door handle pivotally mounted on the bracket. According to the invention, the assembly includes coacting mounting structures on the module plate and on the bracket operative in response to sliding movement of the bracket relative to the module plate to mount the bracket on the module plate.

According to a further feature of the invention apparatus, the coacting mounting structures are operative to mount the bracket on the module plate while allowing limited adjustment of the bracket relative to the module plate.

According to a further feature of the invention apparatus, the coacting mounting structures are operative in response to the sliding movement to snap the bracket in place relative to the mounting plate.

According to a further feature of the invention apparatus, the coacting mounting structures comprise a plurality of tabs on one of the mounting plate and bracket coacting with a respective plurality of keyways in the other of the mounting plate and bracket. In the disclosed embodiment of the invention, the tabs are provided on the module plate and the keyways are provided in the bracket.

According to a further feature of the invention apparatus, the tabs have a "T" cross-sectional configuration including a relatively narrow stem portion outstanding from the module plate or bracket and a relatively wide horizontal bar portion on the free end of the stem portion, and each keyway includes a relatively wide entry portion sized to pass the bar portion of a respective tab and a relatively narrow home portion sized to accommodate the stem portion of a respective tab.

According to a further feature of the invention apparatus, one of the keyways includes a snap structure whereby the stem portion of a tab passing into the home portion of the keyway is snappingly engaged by the keyway snap structure.

According to a further feature of the invention apparatus, each keyway includes a throat between the entry portion and the home portion and the keyway snap structure comprises cantilevered resilient fingers terminating at the throat of the keyway, resiliently yielding in response to movement of the tab stem portion into the keyway throat, and snapping back following movement of the tab stem portion into the keyway home portion to latchingly engage the tab stem portion and preclude inadvertent withdrawal of the tab from the keyway home portion.

According to a further feature of the invention apparatus, the sliding movement of the bracket is a linear movement and the latching engagement of the tab stem portion allows a limited amount of linear movement of the bracket relative to the module plate to facilitate the installation of other door accessory items on the door structure.

Although the invention method and apparatus are illustrated and described herein in association with a door module, features of the invention allow the disclosed handle mounting structure to be utilized in the mounting of a handle assembly directly to a door structure rather than to a module plate positionable within a door structure.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
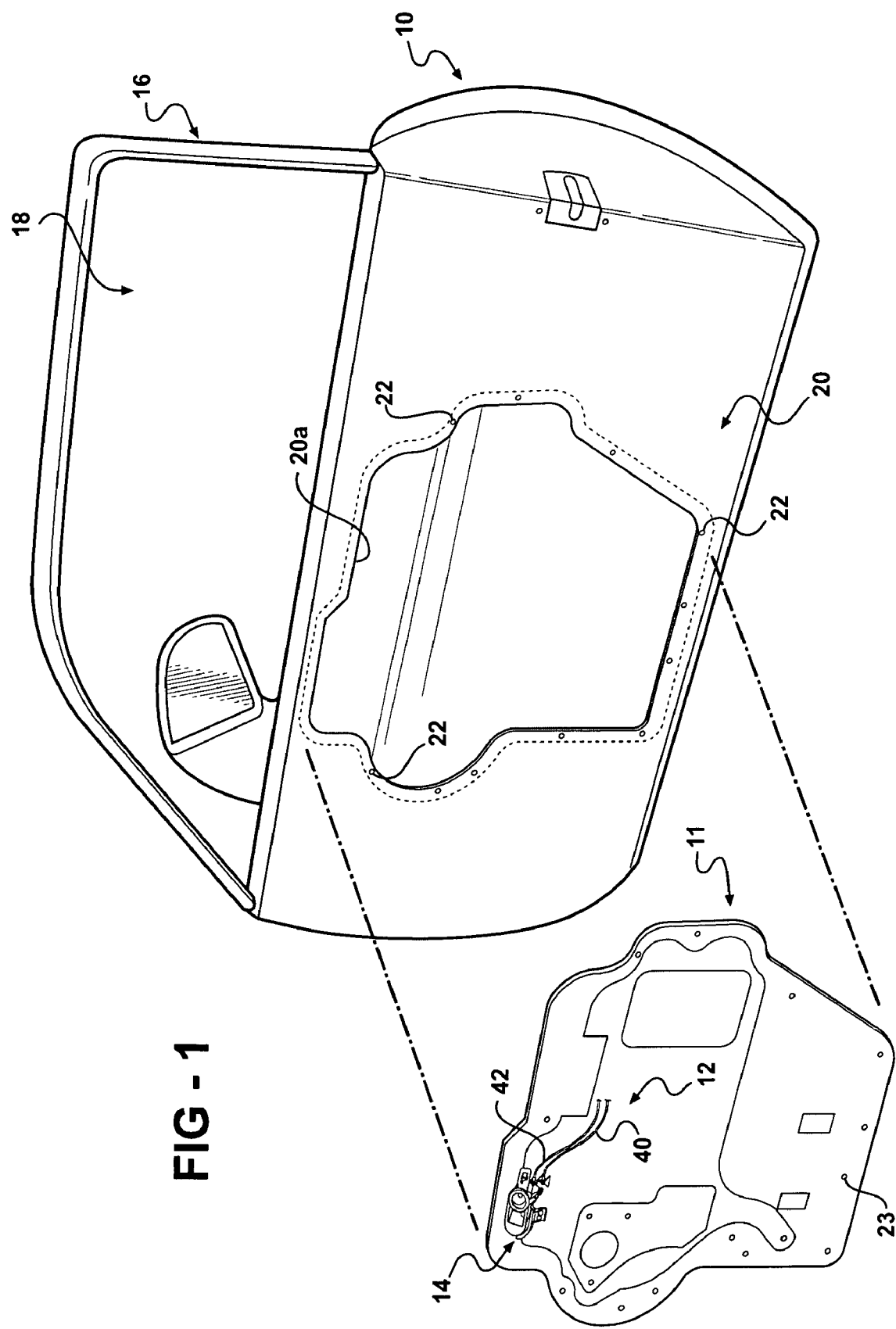
FIG. 1 is a somewhat schematic exploded view of a motor vehicle door structure.
Figure 2:
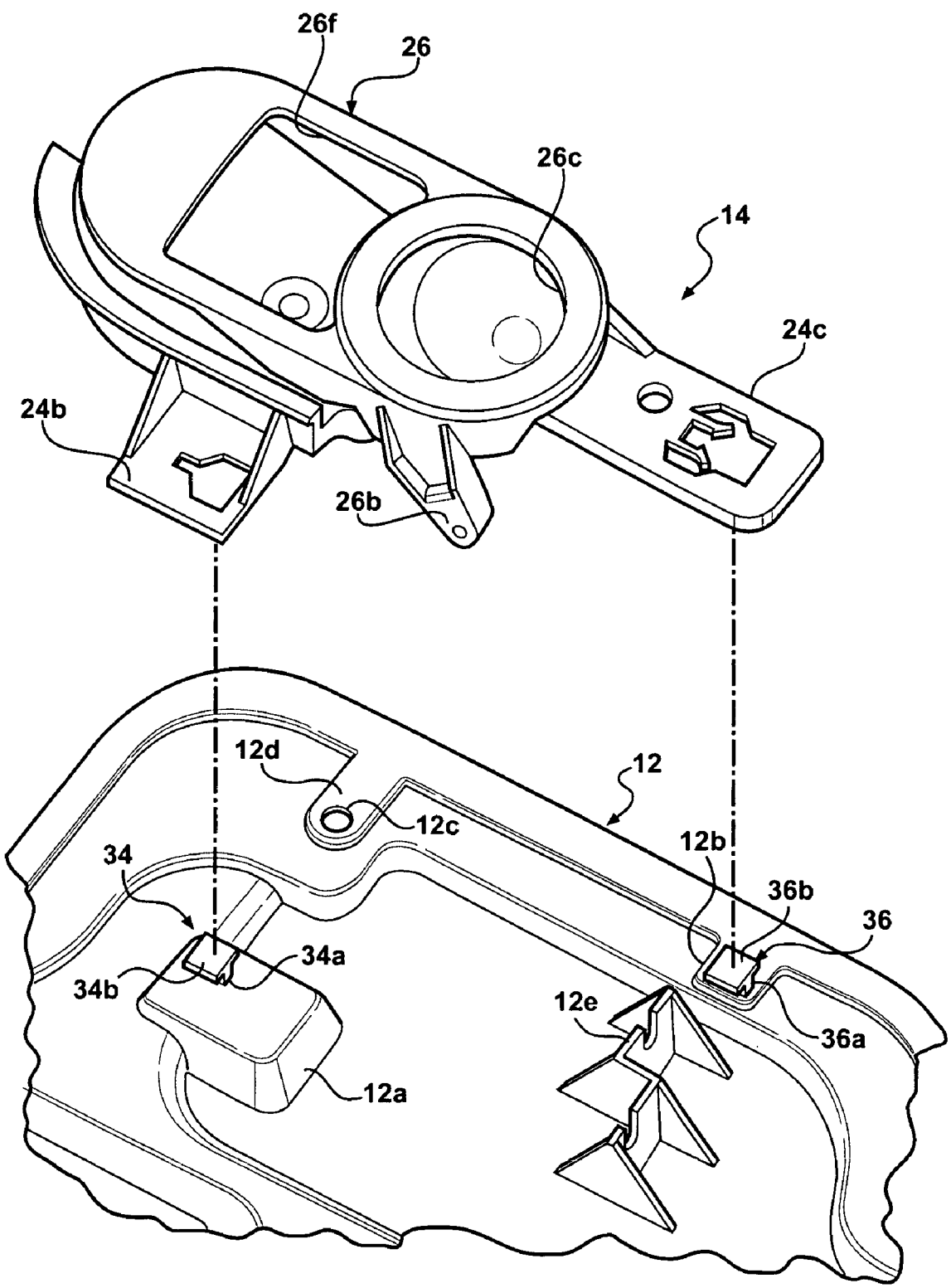
FIG. 2 is a view of an inside door handle assembly shown in exploded association with a module plate.
Figure 3:
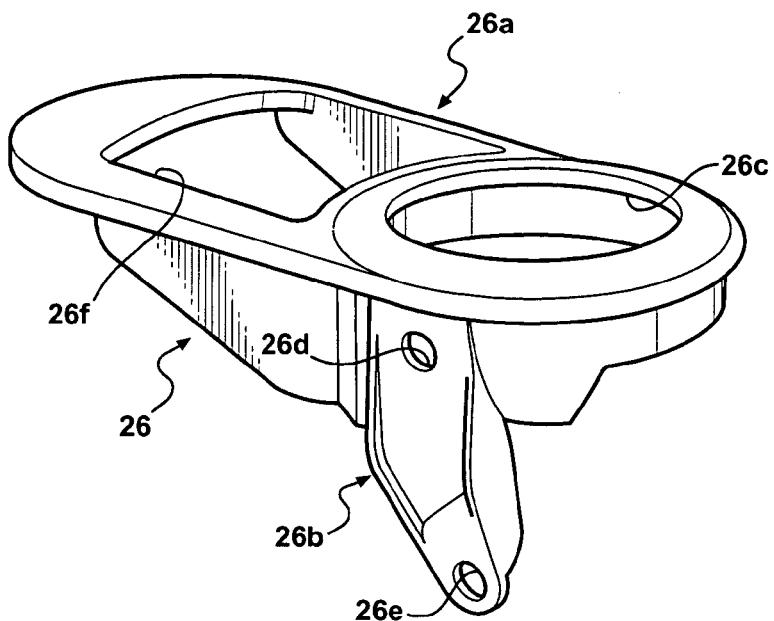
FIG. 3 is a perspective view of an inside door handle assembly.
Figure 4:
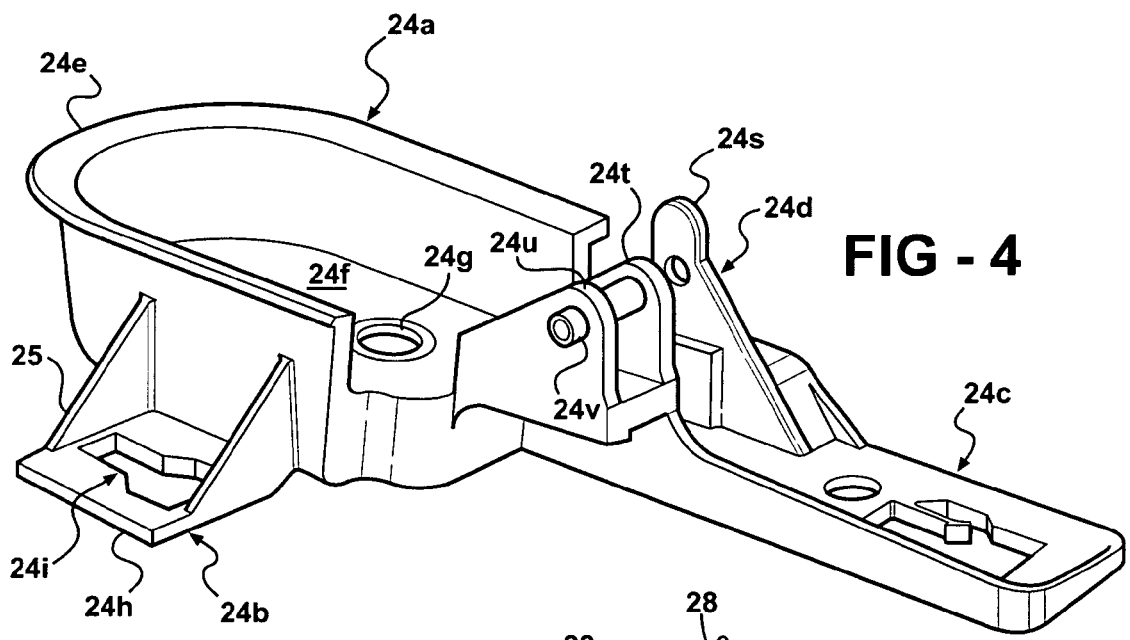
FIG. 4 is a perspective view of a inside door handle bracket.
Figure 5:
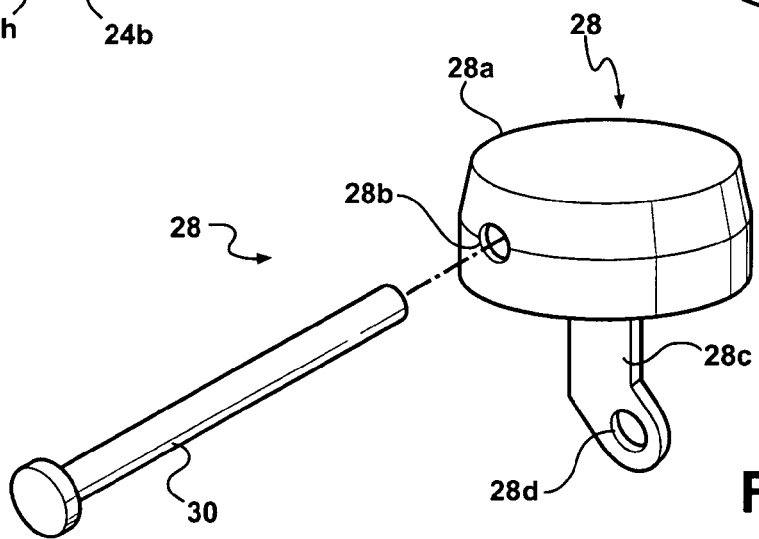
FIG. 5 is a perspective view of an inside door handle lock button.
Figure 6:
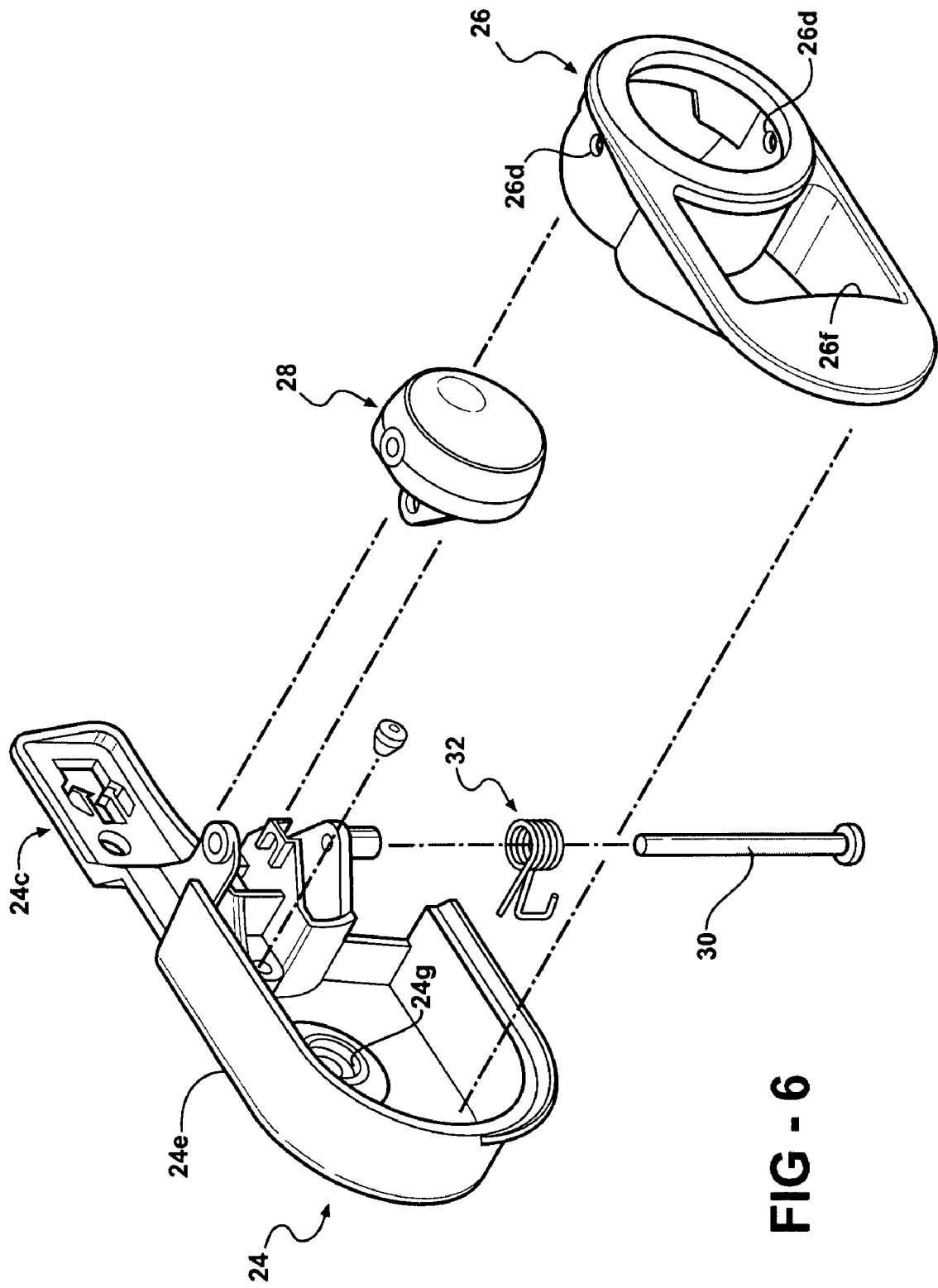
FIG. 6 is an exploded perspective view of the inside door handle assembly.
Figure 7:
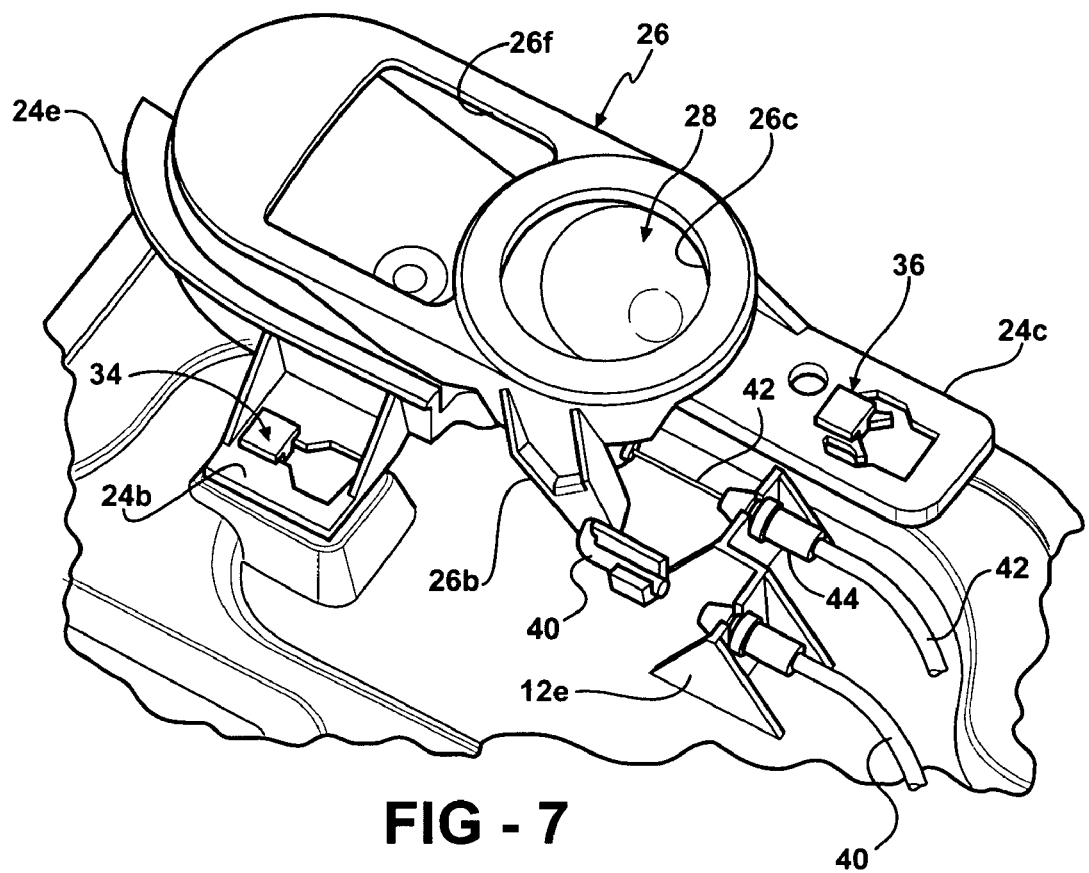
FIG. 7 is a fragmentary perspective view showing the inside door handle assembly installed on the module plate.
Figure 8:
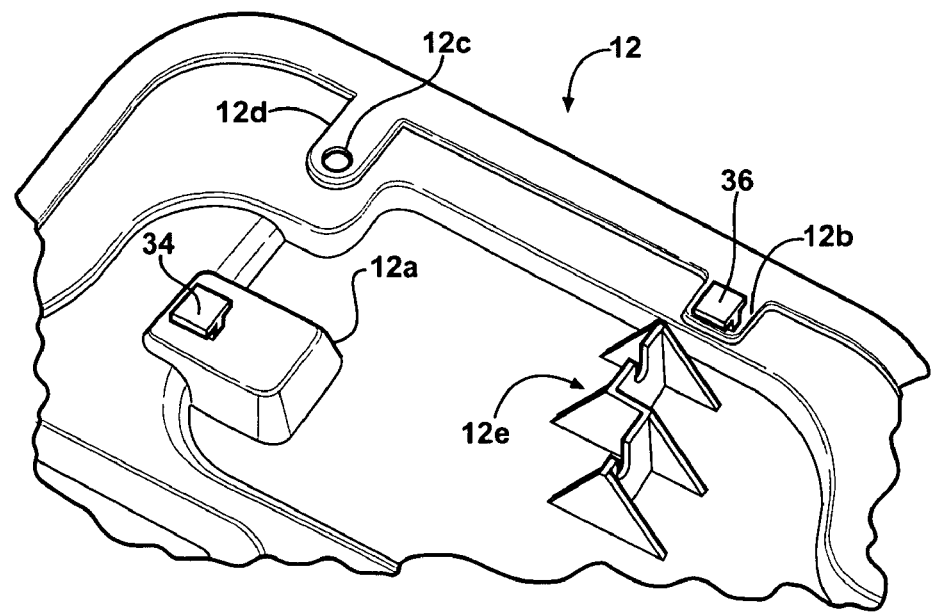
FIG. 8 is a fragmentary perspective view showing details of the portion of the module plate receiving the inside door handle assembly.

The motor vehicle door seen schematically and fragmentarily in FIG. 1 includes a door structure 10 and a door module 11 including a module plate 12 and an inside door handle assembly 14.

Door structure 10 includes a frame portion 16 defining a window opening 18 and an inner panel 20 defining a module opening 20a and a plurality of apertures 22 in spaced surrounding relation to the opening 20a. Door structure 10 is typically formed as a metal fabrication.

Module plate 12 is typically formed of a plastics material in a molding operation, has a size and shape generally conforming to the size and shape of the door inner panel opening 20a, and is secured to the door inner panel within the dash lines seen in FIG. 1 and utilizing suitable fasteners passing though apertures 23 in the module plate and inner door panel apertures 22.

Inside door handle assembly 14 (FIGS. 2-6) includes a bracket 24, an inside handle 26, and a lock button 28 all preferably formed of a suitable plastics material.

Bracket 24 includes a main body portion 24a, an arm portion 24b, an arm portion 24c and a trunnion structure 24d.

Main body portion 24a includes an arcuate flange portion 24e and a floor portion 24f defining an aperture 24g.

Arm portion 24b extends radially outwardly from flange 24e in general alignment with aperture 24g and includes a base portion 24h reinforced by gussets 25. A keyway 24i is formed in base portion 24h. Keyway 24i (FIG. 9) includes a relatively wide generally rectangular entry portion 24j, a relatively narrow home portion 24k and a funneled throat portion 24l interconnecting the portions 24j and 24k.

Arm portion 24c extends generally at right angles to a line passing through aperture 24g and keyway 24i and defines a keyway 24m. Keyway 24m includes a relatively wide generally rectangular entry portion 24n and a pair of cantilevered resilient fingers 24p defining a relatively narrow home portion 24q and having free ends 24r terminating at and defining a throat between the wide entry portion 24n and the narrow home portion 24q.

Trunnion structure 24d defines aligned trunnions 24s, 24t, 24u and a cylindrical journal 24v.

Handle 26 includes a main body portion 26a and an actuator arm portion 26b.

Main body portion 26a defines a generally rectangular handle opening 26f, a circular lock button opening 26c, and aligned pivot pin openings 26d.

Actuator arm 26b extends generally radially downwardly with respect to the associated pivot opening 26d and terminates in a linkage opening 26e.

Lock button 28 includes a generally circular main body portion 28a sized to fit within lock button opening 26c of the handle and defining aligned pivot pin openings 28b, and an actuator arm 28c extending downwardly from the main body portion and terminating in a linkage opening 28d.

In the assembled relation of the inside door handle assembly 14, the door handle 26 and the lock button 28 are pivotally mounted on the bracket 24 by a pivot pin 30 passing though an aperture 26d, though journal 24v, though trunnion 24u, though trunnion 24t, though trunnion 24s, and though the other aperture 26d. The handle and the lock button are thus pivotally mounted on the pivot axis defined by the pivot pin 30 for pivotal movement relative to each other and relative to the bracket. A coil spring 32 positioned around journal 24v provides resilient resistance to the pivotal movement of the handle relative to the bracket.

The handle assembly is mounted on module plate 12 utilizing the keyways 24i, 24m in coaction with tabs molded integrally with the module plate. Specifically, a first tab 34 is formed integral with the module plate for coaction with keyway 24i and a second tab 36 is formed integral with the module plate for coaction with keyway 24m.

Tab 34 is formed on a module plate pad 12a and has a "T" cross-sectional configuration including a relatively narrow stem portion 34a upstanding from the pad 12a and a relatively wide horizontal, generally rectangular bar portion 34b on the free upper end of the stem portion.

Tab 36 upstands from a pad 12b of the module plate and has a "T" cross-sectional configuration including a relatively narrow stem portion 36a upstanding from the pad and a relatively wide, horizontal, generally rectangular bar portion 36b on the free upper end of the stem portion. The module pads and the tabs are configured such that the tops of the pads 12a and 12b are at the same height and the tops of the bar portions 34b and 36b are at the same height.

Module plate 12 further includes an aperture 12c defined in a module plate pad 12d. Aperture 12c and tabs 34 and 36 have a geometrical inter-relationship generally corresponding to the geometrical inter-relationship between aperture 24g and keyways 24i and 24m.

In use, the door module is typically produced by a supplier organization and thereafter is shipped to an OEM manufacturer where the door module is assembled onto the door structure during the vehicle assembly procedure. According to the method and apparatus of the invention, the module plate and inside door handle assembly are produced by the supplier organization, the inside door handle assembly is mounted on the module plate in a manner to retain the bracket on the module plate while allowing limited adjustment of the door handle assembly relative to the module plate, the module plate and the door handle assembly are shipped to the OEM, the module plate is positioned on the door structure and fixedly secured to the door inner panel, the limited adjustability of the door handle assembly relative to the module plate is utilized to adjust the door handle assembly relative to the module plate to facilitate the installation of other motor vehicle door accessory items, and the door handle assembly is fixedly secured to the door structure.

Specifically, at the supplier location, the keyways 24i and 24m of a door handle assembly are positioned proximate the tabs 34 and 36 of a module plate; the bar portions 34b, 36b of the tabs are passed through the entry portions 24j, 24n of the keyways to position the base member 24h of arm 24b against the top of pad 12a and position the arm 24c against the top of pad 12b; and the door handle assembly is slid linearly relative to the module plate to pass the tab stem portions 34a, 36a into the keyway home portions 24k, 24q. As the stem portion 36a passes from the keyway entry portion 24n into the keyway home portion 24q, the fingers 24p yield resiliently to allow the stem portion to move into the home portion as defined by the fingers whereafter the fingers snap back following movement of the tab stem portion into the keyway home portion to latchingly engage the tab stem portion and preclude inadvertent withdrawal of the tab from the keyway home portion. The height of stem portions 34a, 36a is slightly greater than the thickness of floor 24j and arm 24c so that the bar portions 34b, 36b closely and snugly overlie the floor 24j and arm 24c with the stem portions in the home position.

Figure 9:
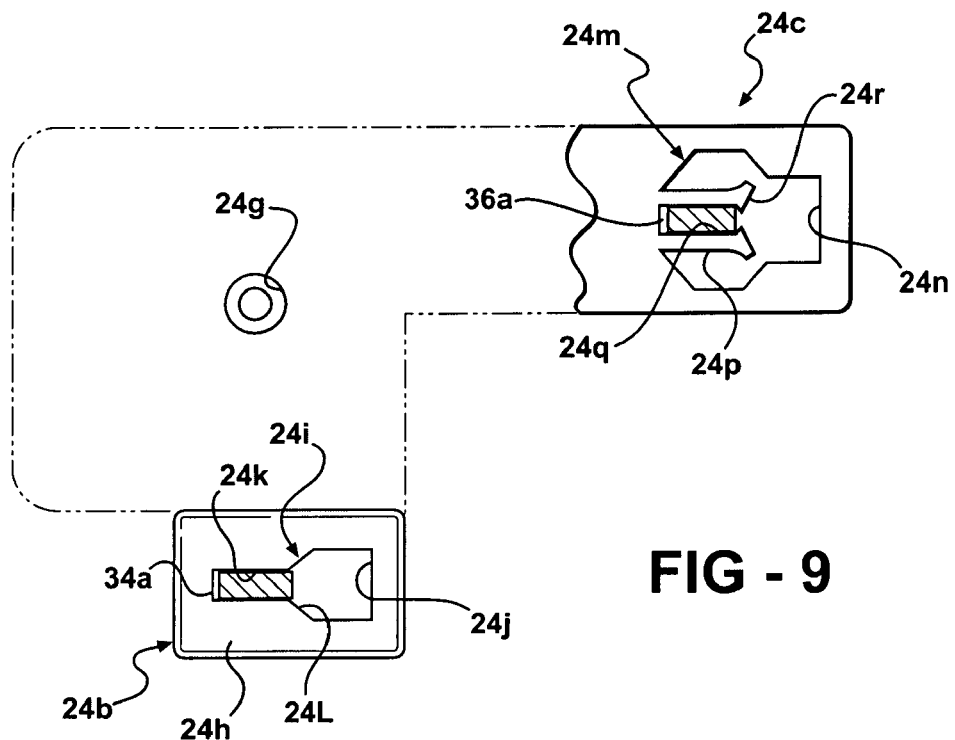
FIG. 9 is a schematic view illustrating the mounting coaction of the inside door handle assembly and the module plate.
Figure 11:
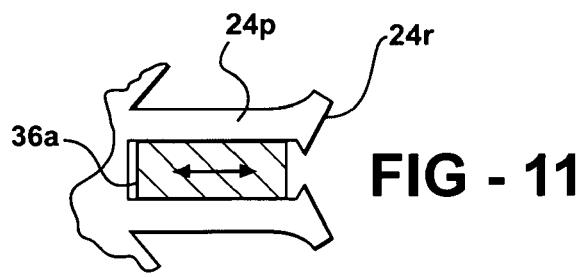
FIG. 11 is a fragmentary view showing a detail of the mounting of the inside door handle to the inside door handle bracket.

The tabs, keyways and fingers are dimensioned such that, with the stem portions positioned in the keyway home portions, a limited amount of linear adjustment movement of the inside door handle assembly relative to the module plate is permitted. Specifically, as best seen in FIGS. 9 and 11, the keyway home portion defined by the fingers 24p is somewhat longer than the length of the tab stem portion 36a so that the inside door handle assembly is free to move linearly relative to the module plate a limited amount without detaching the door handle assembly from the module plate. Following the mounting of the door handle assembly on the module plate, a door latch cable 40 is secured to actuator arm 26b and a door lock cable 42 is secured to actuator arm 28c. The mounting of the cables on the module plate is facilitated by lugs 12e formed integrally with the module plate coacting with cable end connector members 44.

After the module plate has been installed on the inner panel 22 of the door structure the limited amount of adjusting movement of the inside door handle assembly relative to the module plate may be utilized to facilitate the installation of related door accessory items on the door structure. For example, the limited amount of adjusting movement may be utilized to facilitate the precise positioning of the cables 40 and 42 and this limited amount of adjusting movement also facilitates the installation of the interior trim panel (not shown) on the door structure. With respect to the door trim panel, manufacturing tolerance build-ups make it convenient to be able to move the inside door handle assembly in a limited manner relative to the door module to install the door trim panel on the door in surrounding relationship to the inside door handle assembly.

Figure 10:
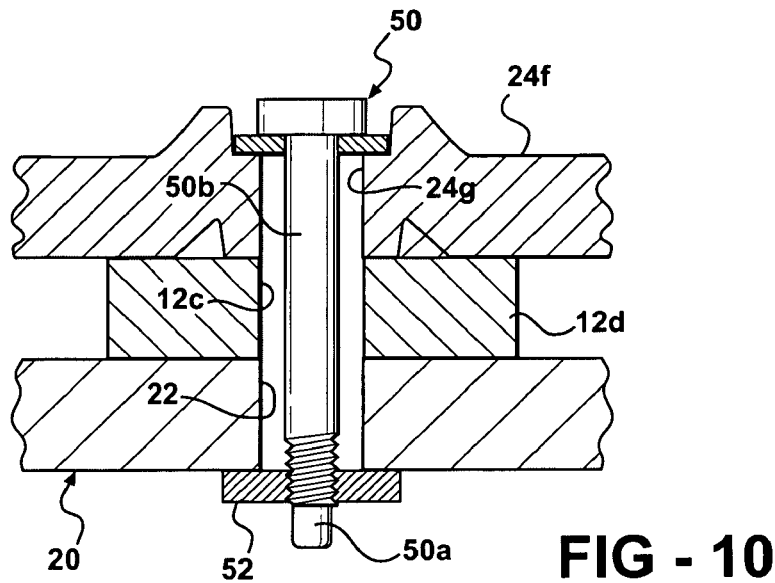
FIG. 10 is a cross-sectional view showing details of the mounting of the inside door handle assembly on the door structure.

After the limited amount of linear adjusting movement of the inside door handle assembly relative to the module plate has been utilized to facilitate the installation of the various door accessory items, and with reference to FIG. 10, a screw 50 is passed downwardly through aligned apertures 24g, 12c and 22 for engagement with a weld nut 52 positioned in surrounding relation to aperture 22 whereby to complete the securement of the door module assembly to the door inner panel. Screw 50 preferably has a smooth shank with a dog tip lead 50a so that it may search for and locate the threaded opening of the weld nut 52 irrespective of the final position of lateral adjustment of the inside door handle assembly relative to the module plate. In this regard, the apertures 24g, 12c and 22 are all oversized with respect to the shank 50b of the screw 50 to accommodate this lateral adjustment.

The method and apparatus of the invention will be seen to provide many important advantages. Specifically, the invention design allows for positive retention of the door handle assembly on the module plate during shipping between the supplier facility and the OEM facility; allows controlled adjustment of the door handle assembly relative to the module plate during vehicle assembly to facilitate the installation of door accessory items irrespective of tolerance build ups; reduces the number of fasteners (and potential water entry paths) for the door module assembly; allows the handle assembly to be used in multiple door applications including full window door frame door constructions and door constructions without a window frame; and provides a strong, positive mounting of the door handle assembly on the door structure by virtue of the triangulated mounting provided by the final fastener 50 and the spaced tabs 34 and 36. Further, the snap mounting of the door handle assembly provides universal mounting capability for the handle assembly and specifically allows the door handle assembly to be used in a door module application or in a conventional application where the door handle assembly is mounted directly to the door structure.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A motor vehicle door module assembly including a module plate positionable within a vehicle door structure, a door handle bracket mounted on the module plate, and an inside door handle pivotally mounted on the bracket, characterized in that:

the assembly includes coacting mounting structures on the module plate and on the bracket operative in response to sliding movement of the bracket relative to the module plate to mount the bracket on the module plate, wherein the coacting mounting structures are operative to mount the bracket on the module plate while allowing limited adjustment of the bracket relative to the module plate once mounted thereto:

wherein the coacting mounting structures comprise first and second tabs on one of the module plate and bracket and corresponding first and second keyways in the other of the module plate and bracket;

wherein the first and second tabs each have a T cross-sectional configuration including a stem portion outstanding from the module plate or bracket and a horizontal bar portion on a free end of the stem portion, each said horizontal bar portion being wider than its respective said stem portion, and the first and second keyways each include an entry portion sized to allow the bar portion of the corresponding tab to pass therethrough and a home portion sized to accommodate the stem portion of the corresponding tab;

wherein the second keyway includes a keyway latch structure which latchingly engages the stem portion of the second tab when disposed within the home portion of the second keyway;

wherein each of the first and second keyways includes a throat between the entry portion and the home portion; and wherein the keyway latch structure in the second keyway comprises cantilevered resilient fingers terminating at the throat of the second keyway, the fingers resiliently yielding in response to movement of the second tab stem portion into the throat of the second keyway and resiliently returning to an original position following movement of the second tab stem portion into the home portion of the second keyway to latchingly engage the second tab stem portion and preclude inadvertent withdrawal of the second tab from the second keyway's home portion.

2. A motor vehicle door module assembly according to claim 1 wherein:

the sliding movement of the bracket relative to the module plate is a linear movement; and the latching engagement of the second tab stem portion with said fingers allows a limited amount of linear movement of the bracket relative to the module plate for facilitating the installation of the module plate and related items on the vehicle door structure.

3. A motor vehicle door assembly including a door, a bracket, and a door handle pivotally mounted on the bracket, characterized in that:

a plurality of tabs are provided on one of the bracket and door and a plurality of keyways are provided on the other of the bracket and door for respective sliding receipt of the tabs, wherein the keyways and tabs are operative in response to the sliding receipt of the tabs in the keyways to latch the bracket in place relative to the door, and wherein the keyways and tabs are further operative to allow limited adjustment of the bracket relative to the door once the bracket is latched in place relative to the door; once latched in place:

wherein the tabs each have a "T" cross-sectional configuration including a stem portion outstanding from the door or bracket and a horizontal bar portion on a free end of the stem portion, each said horizontal bar portion being wider than its respective said stem portion;

wherein each said keyway includes an entry portion sized to allow the horizontal bar portion of a respective cone of said tabs to pass therethrough and a home portion sized to accommodate the stem portion of said respective tab;

wherein each said keyway includes a throat between the entry portion and the home portion;

at least one of the keyways includes a keyway latch structure which latchingly engages the stem portion of the respective one of said tabs, passing into the home portion of the at least one keyway, and the keyway latch structure comprises cantilevered resilient fingers terminating at the throat of the at least one keyway, resiliently yielding in response to movement of the respective tab stem portion into the at least one keyway throat, and resiliently returning to an original position following movement of the respective tab stem portion into the at least one keyway home portion to latchingly engage the respective tab stem portion and trap the respective tab stem portion in the home portion of the at least one keyway.

4. A motor vehicle door assembly according to claim 3 wherein the at least one keyway home portion is sized to permit a limited degree of linear play of the respective tab stem portion latchingly trapped in the home portion of the at least one keyway.

* * * * *